Feb. 20, 1923.
J. B. GUM
EYEGLASS MOUNTING
Filed Mar. 20, 1922
1,445,941
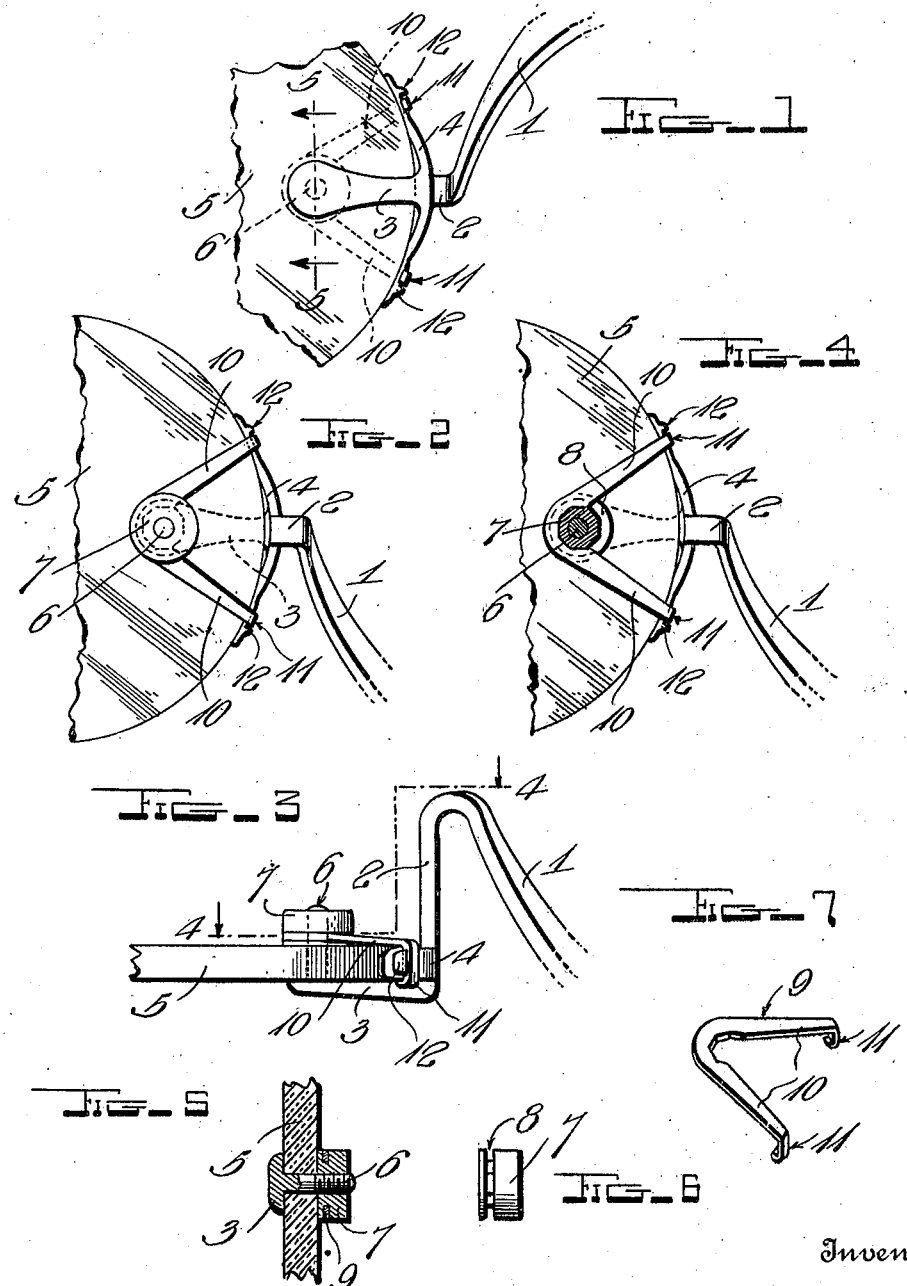
Inventor
Jacob B. Gum
By H. B. Wilson & Co.
Attorneys Patented Feb. 20, 1923.

1,445,941

UNITED STATES PATENT OFFICE.

JACOB B. GUM, OF MOUNT VERNON, MISSOURI.

EYEGLASS MOUNTING.

Application filed March 20, 1922. Serial No. 545,162.

*To all whom it may concern:*

Be it known that I, JACOB B. GUM, a citizen of the United States, residing at Mount Vernon, in the county of Lawrence and State of Missouri, have invented certain new and useful Improvements in Eyeglass Mountings; and I do declare the following to be a full, clear, and exact description of the invention, such as will enable others skilled in the art to which it appertains to make and use the same.

This invention relates to an improved mounting for use in connection with eyeglasses and one object of the invention is to so construct the mounting that the lens may be firmly held in place and at the same time permitted to have a certain amount of movement under strain thus preventing danger of the lens being broken at the point where the securing screw or stem passes through an opening formed in the lens.

Another object of the invention is to so construct this mounting that the fastener which passes through the opening in the lens may be in the form of a threaded stem instead of a securing screw, the securing nut carried by the stem being engaged by a securing element which serves to hold the securing nut in place and further serves as means to hold the lens and resilient bridge carried wing in engagement with each other.

Another object of the invention is to so construct this nut-locking and wing-engaging device that it may be readily put in place after the securing nut has been tightened.

Another object of the invention is to so construct the anchoring element and wing that when the anchoring element is in place, the arms thereof which engage the end portion of the wing cannot readily slip out of engagement with the wing.

This invention is illustrated in the accompanying drawings, wherein:

Figure 1 is a view showing a portion of a pair of eye-glasses in front elevation with the lens held in place by the improved construction.

Figure 2 is a view showing the structure of Fig. 1 in rear elevation.

Figure 3 is a top plan view of the structure shown in Figs. 1 and 2.

Figure 4 is a view similar to Fig. 2 with portions thereof taken along the line 4—4 of Fig. 3.

Figure 5 is a sectional view taken along the line 5—5 of Fig. 1.

Figure 6 is an enlarged view showing the securing nut in side elevation.

Figure 7 is a perspective view of the device for securing the nut against rotation and holding the wing in engagement with the lens.

The eye-glasses will be provided with the usual bridge 1 which will be constructed in a conventional manner for use in connection with spectacles or for use in connection with nose glasses. This bridge 1 has been shown provided with side arms 2 and at each side will be provided with a finger-extension 3 and with a wing 4 which will be resilient so that the portions of the wing which extend in opposite directions from the arm 2 may be drawn into engagement with the edge of the lens and may permit the lens to have a certain amount of movement thus preventing the lens from being broken. This lens 5 is provided with the usual fastener-receiving opening to receive a threaded stem 6 which is rigid with the finger-extension 3 instead of being in the form of a screw passing through an opening formed in the finger-extension. By having this stem rigid with the finger-extension, the stem cannot turn and have a tendency to work loose from the securing nut 7 which is screwed upon its threaded end portion. This securing nut is screwed into place after the lens has been put in place and will not need to be screwed very tightly into place as the securing nut is to be locked against turning. Adjacent the inner end of the securing nut, there has been provided a reduced neck portion 8 which is formed with flat sides as shown clearly in Fig. 4 and will preferably be provided with six sides but of course may be provided with any number of sides desired so that it will resemble a securing nut of a conventional construction. The anchoring device which is shown in Fig. 7 and indicated in general by the numeral 9 is substantially V-shaped and provided with arms 10 which extend in diverging relation to each other and have their free end portions provided with hooks 11. At the junction of the arms 10, this anchoring device is provided with a recess which is shaped to receive the neck portion 8 of the securing nut 7 and hold this securing nut against turning as shown in Fig. 4. This anchoring device when put in place receives the neck portion of the securing nut and has its arms extending as shown clearly in Figs. 2 and 4 with the hooked end portions of the arms positioned for engaging the end portions of the wings 4. These hooked ends will be snapped into engagement with the end portions of the resilient wing and therefore the arms of the anchoring device will be securely held in engagement with the end portions of the wing. It should be noted that the wings have been provided with prongs or lugs 12 which by engaging the hooked ends of the arms of the anchoring device will serve to prevent the hooked ends of the anchor arms from slipping off of the ends of the wings. Therefore when this anchoring device is in place, it will serve to retain the end portions of the wings in close contact with the edge of the lens and further will serve as a nut-lock to hold the securing nut 7 against turning. It will thus be seen that there has been provided a construction in eye-glasses by means of which the lenses may be very securely held in place and prevented from having movement out of proper position due to loosening of securing screws which pass through the lenses, and further there has been provided a construction which will permit of the lenses being wiped with chamois and cleaned without danger of the lenses being broken at the openings through which the fasteners pass when subjected to excessive strain in wiping. It will also be noted that there has been provided a construction in which the same elements may serve as locking means for the securing nut carried by the threaded stem and also as anchoring means for holding the end portions of the resilient wings in close contact with the edge of the lens.

I claim:

1. In an eye-glass structure, a frame element provided with a finger extension, a threaded fastener extending from said finger, a resilient wing extending transversely of the finger with its end portions extending upon opposite sides thereof, a securing nut screwed upon said fastener, and common means for holding the nut against turning and holding the wing in engagement with the edge of a lens and under tension.

2. In an eye-glass structure, a frame element provided with a finger extension, a threaded fastener extending from said finger, a resilient wing extending transversely of the finger with its end portions extending upon opposite sides thereof, a securing nut screwed upon said fastener, and means having engagement with the nut and end portions of the wing to hold the nut against turning and hold the wing in engagement with the edge of a lens.

3. In an eye-glass structure, a frame element provided with a finger extension, a threaded fastener extending from said finger, a resilient wing extending transversely of the finger with its end portions extending upon opposite sides thereof, a securing nut screwed upon said fastener, and an anchor element fitting about the nut to hold the nut against turning and having arms engaging the wing to hold the wing in engagement with a lens and under tension.

4. In an eye-glass structure, a frame element provided with a finger extension carrying a rigid threaded stem, a resilient wing extending transversely of the inner end of said finger, a lens securing nut screwed upon said stem and having a poly-sided portion, and an anchor element engaging the poly-sided portion of said nut to hold the nut against turning and having arms engaging the wing to hold the wing in engagement with the edge of a lens and under tension.

5. In an eye-glass structure, a frame element provided with a finger extension carrying a rigid threaded stem, a resilient wing extending transversely of the inner end of said finger, a lens securing nut screwed upon said stem and having a poly-sided portion, and an anchor element having a recess receiving and conforming to the contour of the poly-sided portion of said nut to hold the nut against turning and having arms provided with hook portions engaging the end portions of the resilient wing to hold the same in engagement with the edge of a lens.

6. The structure of claim 5 having the end portions of the wing engaging the arms of the anchor element to hold said arms against slipping off the ends of the wing.

7. In an eye-glass structure, a frame element provided with a finger extension and a resilient wing extending upon opposite sides of the finger for engaging the edge of a lens, a threaded stem rigid with and extending from the finger for passing through a fastener receiving opening of a lens, a securing nut screwed upon said stem and having a reduced poly-sided neck, a V-shaped anchor having its arms provided with hooked free ends for engaging the end portions of said wing and holding the end portions of the wing in engagement with the edge of a lens, the anchor being provided at the junction of its arms with a recess receiving the neck of said nut and having engagement with the sides thereof to hold the nut against turning, and prongs extending from the end portions of the wing and engaging the arms of the anchor to hold the arms of the anchor against slipping off the ends of the wing.

In testimony whereof I have hereunto set my hand.

JACOB B. GUM.